United States Patent [19]

Weinhold

[11] Patent Number: 4,643,464
[45] Date of Patent: Feb. 17, 1987

[54] DEVICE FOR CONNECTING TWO PIPE ENDS

[76] Inventor: Karl Weinhold, Im Jagdfeld 43, 4040 Neuss, Fed. Rep. of Germany

[21] Appl. No.: 645,072

[22] Filed: Aug. 28, 1984

[30] Foreign Application Priority Data

Sep. 9, 1983 [DE] Fed. Rep. of Germany ....... 3332518
Nov. 11, 1983 [DE] Fed. Rep. of Germany ....... 3340899

[51] Int. Cl.⁴ .............................................. F16L 21/00
[52] U.S. Cl. .................................... 285/233; 285/286; 285/365
[58] Field of Search ............... 285/233, 234, 383, 366, 285/367, 407, 408, 409, 410, 411, 286

[56] References Cited

U.S. PATENT DOCUMENTS

| 1,888,260 | 11/1932 | Clark | 285/383 |
|---|---|---|---|
| 3,002,772 | 10/1961 | Schustack | 285/383 |
| 3,013,821 | 12/1961 | Bogan | 285/407 |
| 3,179,445 | 4/1965 | Moretti | 285/383 |
| 3,405,957 | 10/1968 | Chakroff | 285/233 |
| 3,635,506 | 1/1972 | Womble | 285/411 |
| 3,700,266 | 10/1972 | Glehn | 285/383 |
| 3,937,501 | 2/1976 | Weinhold | 285/409 |
| 4,249,786 | 2/1981 | Mahoff | 285/233 |
| 4,346,918 | 8/1982 | Lycan | 285/383 |
| 4,471,979 | 9/1984 | Gibb et al. | 285/411 |

FOREIGN PATENT DOCUMENTS

| 2001628 | 7/1971 | Fed. Rep. of Germany . | |
|---|---|---|---|
| 1283686 | 12/1961 | France . | |
| 1395957 | 3/1965 | France | 285/408 |
| 0951003 | 3/1964 | United Kingdom | 285/233 |
| 1334182 | 10/1973 | United Kingdom . | |
| 1503055 | 3/1978 | United Kingdom . | |
| 1550284 | 8/1979 | United Kingdom . | |
| 0666363 | 6/1979 | U.S.S.R. | 285/410 |

Primary Examiner—Cornelius J. Husar
Assistant Examiner—Anthony Knight
Attorney, Agent, or Firm—Spencer & Frank

[57] ABSTRACT

The invention relates to a device for connecting two pipe ends, having a socket, a spigot and an annular seal therebetween. These parts are clamped together by flanges of a clamp in order to close the device. While prior art sockets and spigots have been made of massive material and shaped by expensive machining processes, the invention provides the spigot which is formed as a generally U-shaped profiled ring having a front and a rear annular flange and holding the sealing element between the flanges. The outside diameter of the front flange is smaller than that of the rear flange. The socket may also be a profiled ring in order to further reduce the manufacturing costs.

10 Claims, 3 Drawing Figures

DEVICE FOR CONNECTING TWO PIPE ENDS

BACKGROUND OF THE INVENTION

This invention relates to a device for connecting two pipe ends having socket means and spigot means adapted to be inserted into the socket means, with an annular sealing element positioned in an annular groove between the socket means and the spigot means and with a clamp surrounding the pipe ends and having inwardly extending flanges at both ends. The flanges grip the socket means and the spigot means from outside when the device is closed. The clamping means is adapted to be locked with locking means.

In a known device of this type, the spigot and socket have been welded to their respective pipe ends. The socket and the spigot are massive steel elements made of solid material and given the required structural shapes by turning, milling and/or drilling.

Such a machining is relatively expensive. When the piping can no longer be used due to wear or damage, the spigot-and-socket elements of a pipe joint of this type must be considered as a loss as well since it is not economical to separate these elements from the piping and adapt them for further use.

SUMMARY OF THE INVENTION

It is an object of this invention to provide a suitable device for connecting two pipe ends which device can be manufactured at reduced production costs without expensive mechanical machining.

According to the invention, the spigot means is formed by a ring defining a peripheral groove generally U-shaped in cross-section. The groove receives the annular seal between a front and a rear annular flange. The outside diameter of the front annular flange is smaller than the outside diameter of the rear annular flange.

This structural design makes it possible to manufacture the spigot of sheet steel that can be brought into a desired shape at substantially lower machining expenses. A finishing treatment is no longer required, at least not on a noticeable scale. If the piping itself has to be hot galvanized, the spigot can be welded to the untreated pipe first and then subjected to the galvanizing process together with the pipe.

As the front annular flange of the spigot is smaller than the rear annular flange, the spigot can be easily inserted into the socket. The smaller diameter of the front flange also facilitates the application of the annular seal. However, the most important advantage provided by the smaller diameter of the front flange is in providing the possibility of a relative articulation of the pipe ends within the limit of the pipe joint. It has been found that the tightness and loading capacity of the structure are not unduly impaired by the structural simplification according to the invention.

Furthermore, it is proposed in accordance with the invention, that the clamp be provided with at least two protrusions or bulges spaced from each other over its circumference and projecting radially inwardly. They serve the purpose of radially centering the clamp on the socket.

The manufacturing costs can be further reduced by a simplified structure of the socket of the invention such that the socket is a shaped or profiled ring which is fastened by a radial part thereof to the associated pipe end and surrounds the spigot with a cylindric portion, wherein the length of the cylindric portion corresponds to the axial spacing between the flanges of the clamp.

This profiled ring can also be made of sheet steel and can be shaped in one operation. The spigot can be fully inserted into the profiled ring. With the device closed, the clamp is placed over the profiled ring to secure the device against axial disengagement. If necessary, the profiled ring can be hot galvanized in one operation together with the associated pipe end.

Devices for connecting two pipe ends are known which have a socket into each end of which a spigot can be inserted so that both ends of a piping are identical and have one spigot each. In such a pipe coupling it is advantageous, according to the invention, if the socket is a cylindrical pipe section whose length corresponds to the axial spacing between the clamp flanges. The socket of this kind can be manufactured by merely cutting a desired length of a pipe of suitable diameter. This also provides a very low manufacturing cost.

In a further embodiment of the invention, it is proposed that a stop element be provided in the socket which is positioned at least approximately in the middle of the length of the socket and arrests further passage of a spigot. As a result, when the first spigot is inserted into the pipe stub serving as a socket, the latter is prevented from being drawn too far over the spigot or over the associated pipe end.

Such a stop element can be provided in various forms, e.g. as a plurality of pins mounted in the socket and extending radially inwardly. It is particularly advantageous, according to the invention, if the stop element is a disc which is split at a point on its circumference and whose outer periphery engages into an annular slot provided in the socket. The disc can be inserted or removed without difficulty since it can be adequately compressed. The inner periphery of the disc can be provided with teeth, cutouts etc. to enable a tool to be applied if necessary.

The pipe stub can be secured to the clamp by means of a chain or the like. When a clamp is used which consists of a plurality of half-shells linked together, the pipe stub can also be connected with a stem extending outwardly in radial direction, with a link bolt passing through the stem.

As mentioned above, the design of the invention makes it possible for the pipe ends to be articulated relative to one another. To this end, the device is so structured that an axial clearance is left between a spigot and the radial part of the profiled ring or the spigot belonging to the other pipe end. The size of the clearance is selected to leave a space required for articulating the spigots within the socket.

The outer diameter of the front ring flange is also selected correspondingly; it is sufficient when the front ring flange extends only to approximately the centerline of the circumferential seal as unloaded.

BRIEF DESCRIPTION OF THE DRAWINGS

Two embodiments of the invention are described below in conjunction with a drawing, in which.

DETAILED DESCRIPTION OF PREFERRED EMBODIMENTS

Figure 1:
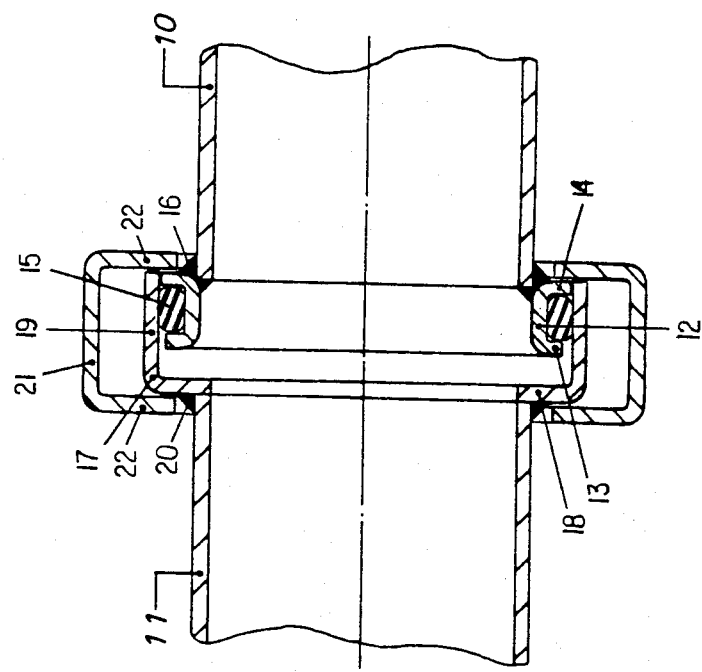
FIG. 1 is a longitudinal sectional view of the first embodiment.

In the embodiment shown in FIG. 1, the pipe ends to be connected are designated with reference numerals 10 and 11. The pipe end 10 has a spigot 12 which is formed by a U-shaped profiled ring. The ring has a front annular flange 13 and a rear annular flange 14. An annular seal 15 is placed in an annular groove limited by the flanges 13, 14. The flange 13 is approximately half as high as the rear flange 14. The spigot 12 is applied flush to the face of the pipe end 10 and fastened thereto by a weld 16.

The other pipe end 11 has a socket 17 of the type of a further profiled ring having a radial section 18 and a cylindric section 19 disposed at right angles with each other. The socket 17 is also applied flush to the face of the pipe end 11 and fastened thereto by a weld 20.

In order to hold both pipe ends together, a clamp 21 is provided which has one inwardly extending flange 22 at each end thereof. The axial clearance between the flanges 22 is adjusted to the axial length of the socket 17 so that the flanges 22 grip the socket 17 from outside at its both axial ends, leaving a small clearance required for a smooth application of the clamp 21.

Furthermore, the axial dimensions are so selected that the spigot 12 has an axial play relative to the radial part 18 of the socket 17 when the spigot 12 is inserted into the socket 17 and the cylindric part 18 overlaps the rear ring flange 14 as well. This axial play makes it possible to articulate the pipe end 10 against the pipe end 11.

Figure 2:
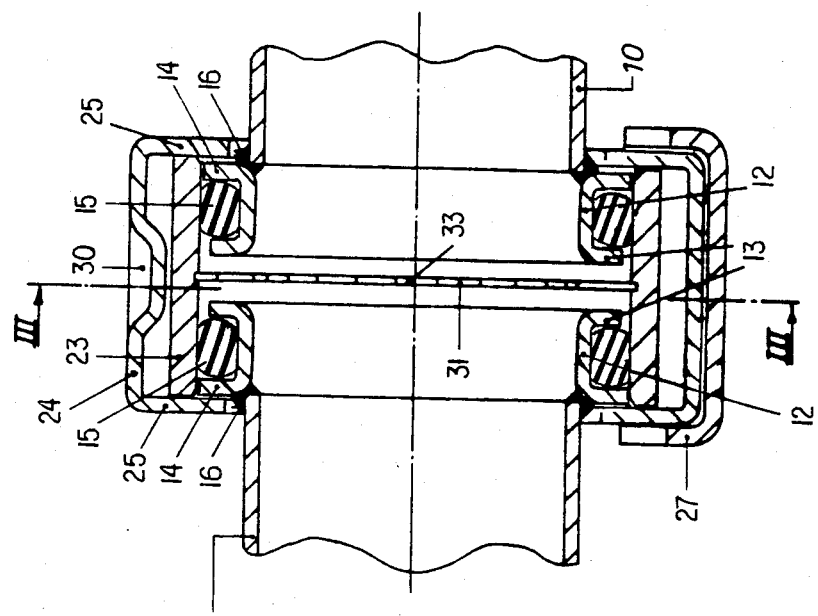
FIG. 2 is a longitudinal sectional view of a modified embodiment of the device.
Figure 3:
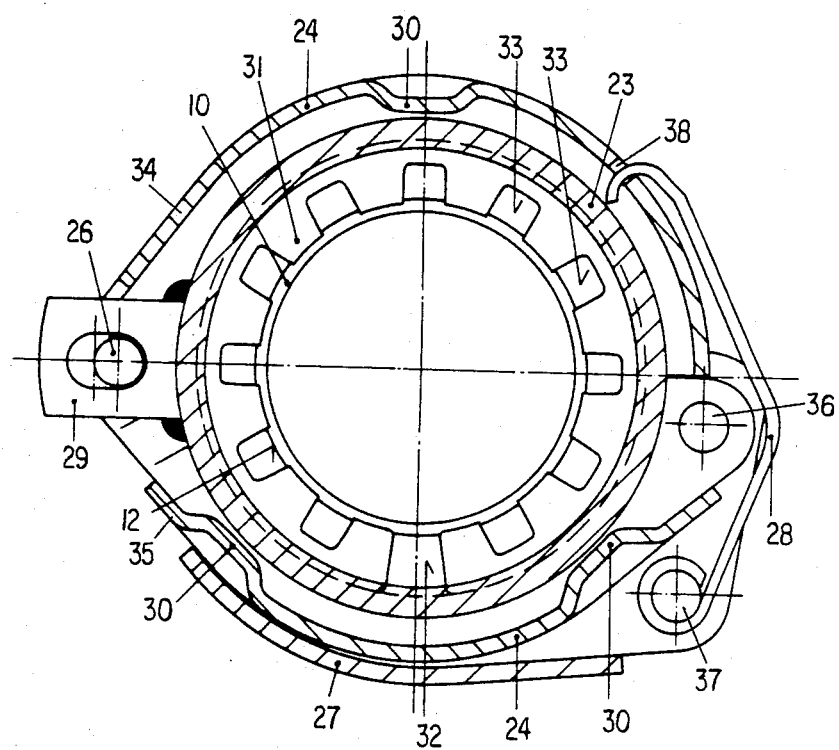
FIG. 3 is a cross-section of the embodiment of FIG. 2.

In the embodiment shown in FIGS. 2 and 3, the pipe end 11 is also provided with a spigot 12. The spigots 12 are similar to the above described embodiment.

Herein, the socket 23 is a simple pipe stub covering both rear flanges 14 of the spigots 12 and is of such a length that an axial spacing is maintained between the spigots 12 even when they are inserted into the pipe stub. Due to the spacing, articulation of the pipe ends 10 and 11 is made possible.

There is provided in this embodiment a clamp 24 of a greater axial width, which has also inwardly extending flanges 25 at both ends. The axial clearance between the flanges 25 is adjusted to the length of the socket 23 in a similar fashion as in the above described embodiment.

The spigots 12 and the sockets 17 or 23 are each formed of sheet steel. The clamp 24 can also be manufactured of sheet metal if required. This part is reusable even when the pipes 10 and 11 are rejected.

As can be seen in FIG. 3, the clamp 24 includes two half-shells 34 and 35. Onto the socket 23 is welded an outwardly extending stem 29. A joint link 26 passes through an opening in stem 29 and openings in half-shells 34 and 35, thus interconnecting these element. Thus, the socket 23 is fastened inseparably to the clamp 24.

A closure or lock for clamp 24 is formed by a gripping lever 27, which is pivotably connected to half-shell 35 by a bolt 36, and a spring 28. One end of spring 28 is secured to a bolt 37 attached to gripping lever 27. The other end is hooked and extends through opening 38 in half-shell 34, as illustrated in FIG. 3, to lock the half-shells together.

The half-shells 34 and 35 are provided with bulges 30 directed radially inwardly. The bulges are of such a size that only a relatively small radial play is maintained between their inner side and the socket 23. Thus, the clamp 24 is well centered over the socket 23.

An annular slot is provided on the inner side of the socket 23. In the slot there is inserted a ring 31 which serves as a stop element. The shape of the ring is apparent from FIG. 3. The ring 31 is split at the location on its circumference designated with reference numeral 32. Moreover, the ring 31 is provided with cutouts 33 distributed over its periphery. The cutouts are open inwardly to facilitate the elastic deformation of the ring 31 during its insertion or removal. In particular, the cutouts 33 near the split are complementary with a tool for assembly purposes. As shown in FIG. 2, the ring 31 is positioned approximately in the middle of the socket 23. There remains at all times an axial play between the ring 31 and the end of spigot 12. the play being of sufficient size not to prevent the pipe ends 10 or 11 from articulating in the socket 23.

I claim:

1. An apparatus for connecting the end of a first pipe to the end of a second pipe, comprising:
   a socket connected to the end of the first pipe, said socket including
      a sleeve having ends and a predetermined length, and
      means welded to said first pipe for sealingly connecting said sleeve to the first pipe, said means including a first annular element with a generally U-shaped cross-section and a predetermined length that is less than the length of said sleeve, said first annular element being welded to the first pipe and being dimensioned to plug into said sleeve, said first annular element having a rear annular flange that abuts the end of the first pipe and having a front annular flange that is spaced apart from said rear annular flange of said first annular element, said front annular flange of said first annular element having an outer diameter that is smaller than that of said rear annular flange of said first annular element, said means further including a first annular seal between said front and rear annular flanges of said first annular element;
   a spigot connected to the end of the second pipe, said spigot including
      a second annular element with a generally U-shaped cross-section and a predetermined length that is less than the length of said sleeve, said second annular element being welded to the second pipe and being dimensioned to plug into said sleeve, said second annular element having a rear annular flange that abuts the end of the second pipe and having a front annular flange that is spaced apart from said rear annular flange of said second annular element, said front annular flange of said second annular element having an outer diameter that is smaller than that of said rear annular flange of said second annular element, and
      a second annular seal between said front and rear annular flanges of said second annular element;
   abutment means inserted into said sleeve at substantially half its length for blocking further penetration of an annular flange;
   clamping means surrounding the pipe ends for clamping the pipes together with said spigot inserted into said socket, said clamping means including inwardly extending flanges having inner surfaces that are spaced apart by a distance corresponding to the length of said sleeve so that the flanges of said clamping means grip behind said ends of said sleeve; and locking means for locking said clamping means to the pipes.

2. An apparatus as defined in claim 1, wherein the interior of said sleeve member has an annular groove positioned at substantially half the length of said sleeve, and wherein said abutment means comprises a ring with an opening at its periphery, said ring being secured in said groove.

3. An apparatus as defined in claim 2, wherein said ring is flat.

4. An apparatus as defined in claim 2, wherein the length of said sleeve is selected so that said front annular flanges are spaced apart from said ring to permit articulation of said pipes.

5. An apparatus for connecting the end of a first pipe to the end of a second pipe, comprising:
   a socket connected to the end of the first pipe, said socket including
      a sleeve having a first end oriented toward said first pipe and having a second end oriented toward said second pipe, and
      means for sealingly connecting said sleeve to the first pipe, said means including a first weld disposed at the end of the first pipe;
   a spigot connected to the end of the second pipe, said spigot including
      an annular element with a generally U-shaped cross-section and a predetermined length that is less than the distance between the first and second ends of said sleeve, said annular element being dimensioned to plug into said sleeve, said annular element having a rear annular flange that abuts the end of the second pipe and having a front annular flange that is spaced apart from said rear annular flange, said front annular flange having an outer diameter that is smaller than that of said rear annular flange,
      a second weld which sealingly connects said annular element to the end of the second pipe, and
      an annular seal between said front and rear annular flanges;
   clamping means secured to said sleeve and surrounding the pipe ends for clamping the pipes together with said spigot inserted into said socket, said clamping means including
      a first clamp flange directed toward said first weld, said first clamp flange being disposed closely adjacent said first end of said sleeve,
      a second clamp flange directed toward said second weld, said second clamp flange being disposed closely adjacent said second end of said sleeve,
      connection means for connecting said first and second clamp flanges, said connection means including a plurality of bulges directed toward said sleeve to center said clamping means around said sleeve and space said clamp flanges apart from the respective welds; and
   locking means for locking said clamping means to the pipes.

6. An apparatus as defined in claim 5, wherein said means for sealingly connecting said sleeve to the first pipe comprises a radially extending member integrally affixed to said sleeve, so that said sleeve and radially extending member form a single element, said first weld connecting said radially extending member to said first pipe.

7. An apparatus as defined in claim 5, wherein said means for sealingly connecting said sleeve to the first pipe comprises:
   a further annular element with a generally U-shaped cross-section and a predetermined length that is less than the distance between the first and second ends of said sleeve, said further annular element being dimensioned to plug into said sleeve, said further annular element having a rear flange that abuts the end of the first pipe and having a front annular flange that is spaced apart from said rear annular flange of said further annular element, said front annular flange of said further annular element having an outer diameter that is smaller than that of said rear annular flange of said further annular element; and
   a further annular seal between said front and rear annular flanges of said further annular element.

8. An apparatus as defined in claim 7, further comprising abutment means inserted into said sleeve at substantially half its length for blocking further penetration of an annular element.

9. An apparatus as defined in claim 8, wherein the interior of said sleeve member has an annular groove positioned at substantially half the length of said sleeve, and wherein said abutment means comprises a ring with an opening at its periphery, said ring being secured in said groove.

10. An apparatus as defined in claim 9, wherein said ring is flat.

* * * * *